US008607159B2

(12) United States Patent
Friedlander et al.

(10) Patent No.: US 8,607,159 B2
(45) Date of Patent: Dec. 10, 2013

(54) GUI FOR AUDIO VIDEO DISPLAY DEVICE (AVDD) WITH PERVASIVE APPEARANCE BUT CHANGED BEHAVIOR DEPENDING ON COMMAND INPUT MODE

(75) Inventors: Steven Friedlander, San Diego, CA (US); David Young, San Diego, CA (US); Sabrina Tai-Chen Yeh, Laguna Beach, CA (US)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 13/188,646

(22) Filed: Jul. 22, 2011

(65) Prior Publication Data
US 2012/0260172 A1    Oct. 11, 2012

Related U.S. Application Data

(60) Provisional application No. 61/473,098, filed on Apr. 7, 2011.

(51) Int. Cl.
*G06F 3/048* (2013.01)

(52) U.S. Cl.
USPC ........... 715/810; 715/765; 715/821; 715/835; 715/863

(58) Field of Classification Search
USPC ........ 715/764, 765, 781, 802, 810, 821, 830, 715/835, 863; 345/173
See application file for complete search history.

(56) References Cited

U.S. PATENT DOCUMENTS

| | | | | |
|---|---|---|---|---|
| 6,023,273 A | * | 2/2000 | Cox et al. | 715/764 |
| 6,201,540 B1 | * | 3/2001 | Gallup et al. | 715/764 |
| 6,571,390 B1 | * | 5/2003 | Dunn et al. | 725/52 |
| 2004/0233239 A1 | * | 11/2004 | Lahdesmaki | 345/810 |
| 2005/0039134 A1 | | 2/2005 | Wiggeshoff et al. | |
| 2007/0226645 A1 | * | 9/2007 | Kongqiao et al. | 715/781 |
| 2008/0078464 A1 | | 4/2008 | Loewe | |
| 2009/0079813 A1 | | 3/2009 | Hildreth | |
| 2009/0133051 A1 | * | 5/2009 | Hildreth | 725/28 |
| 2012/0079429 A1 | * | 3/2012 | Stathacopoulos et al. | 715/830 |

\* cited by examiner

*Primary Examiner* — Xiomar L Bautista
(74) *Attorney, Agent, or Firm* — John L. Rogitz (57) ABSTRACT

A graphical user interface (GUI) on an audio video display device (AVDD) can be operated in at least first and second input modes. When the first input mode is active the GUI has a first behavior and/or appearance whereas when the second input mode is active the GUI has a second behavior and/or appearance.

17 Claims, 5 Drawing Sheets

Figure 1 System

Figure 2 example remote control

GUI FOR AUDIO VIDEO DISPLAY DEVICE (AVDD) WITH PERVASIVE APPEARANCE BUT CHANGED BEHAVIOR DEPENDING ON COMMAND INPUT MODE

This application claims priority to U.S. provisional patent application Ser. No. 61/473,098, filed Apr. 7, 2011.

FIELD OF THE INVENTION

The present application relates generally to user interfaces (UI) for audio video display devices (AVDD) such as televisions (TVs).

BACKGROUND OF THE INVENTION

User interfaces for AVDDs often require a viewer to navigate through a cumbersome system of menus to establish AVDD settings and to gain information pertaining to a particular program. As understood herein, these types of solutions fail to offer a viewer a way to quickly and easily obtain information about a program with minimal user interface steps, nor are they intuitive to many viewers.

Furthermore, present principles understand that it can be desirable to provide for inputting commands to a graphical user interface (GUI) using more than a single input mode. For example, it may be desirable to permit a viewer of an AVDD to input commands using both a remote control (RC) and, if the viewer desires, gestures in free space, distanced from the AVDD, that are captured by a camera and interpreted by the AVDD to correlate to specific commands. As also understood herein, under these conditions countervailing considerations come into play. Specifically, on the one hand it is desirable that the GUI maintain a consistent (and this familiar) appearance no matter what input mode is invoked by the viewer. On the other hand, it is desirable that certain features of the GUI be tailored to best support the particular input mode being used.

SUMMARY OF THE INVENTION

According to principles set forth further below, an audio video display device (AVDD) includes a processor, a video display, and computer readable storage medium bearing instructions executable by the processor to present a graphical user interface (GUI) on the display which includes plural selector elements. The processor presents an indication of a focus on the GUI and responsive to a determination that a first input mode is active and a scroll command is received, moves the focus on the display from a first selector element to a second selector element without moving either selector element. In contrast responsive to a determination that a second input mode is active and a scroll command is received with the focus on a first selector element, the processor does not move the focus on the display. Instead, the processor causes a second selector element to move to be juxtaposed with the focus.

In some embodiments the first input mode is an input device input mode in which a person enters commands using an input device communicating with the AVDD. The second input mode can be a gesture input mode in which a person enters commands by making body gestures in free space distanced from the AVDD, with a camera capturing images of the body gestures and providing the images to the processor.

If desired the GUI may include a border around a GUI element. Responsive to a determination that the first input mode is active, the border is presented in a first shape, whereas responsive to a determination that the second input mode is active, the border is presented in a second shape different from the first shape.

In non-limiting examples, the GUI includes a content panel GUI icon mimicking a grid of information panels and selectable to invoke a GUI presenting the grid of information panels. The border can be around the content panel GUI icon. In addition or alternatively, the GUI may include a button genre indicator indicating a genus of selector elements presented by the GUI, and the border can be around the button genre indicator. In any case, the focus may indicate which button a selection of which will cause an associated function to be invoked.

In another aspect, a method includes presenting a graphical user interface (GUI) on a video display. The method also includes determining which one of at least first and second command input modes is active and responsive to a determination that the first input mode is active, causing the GUI to have a first appearance and a first behavior. Responsive to a determination that the second input mode is active, however, the GUI is caused to have a second appearance and a second behavior different from the first appearance and first behavior.

In another aspect, an audio video display device (AVDD) includes a processor, a video display, and computer readable storage medium bearing instructions executable by the processor to present on the display a graphical user interface (GUI) operable in at least first and second input modes. When the first input mode is active, the processor gives the GUI a first behavior and/or appearance. In contrast, when the second input mode is active, the processor gives the GUI a second behavior and/or appearance.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
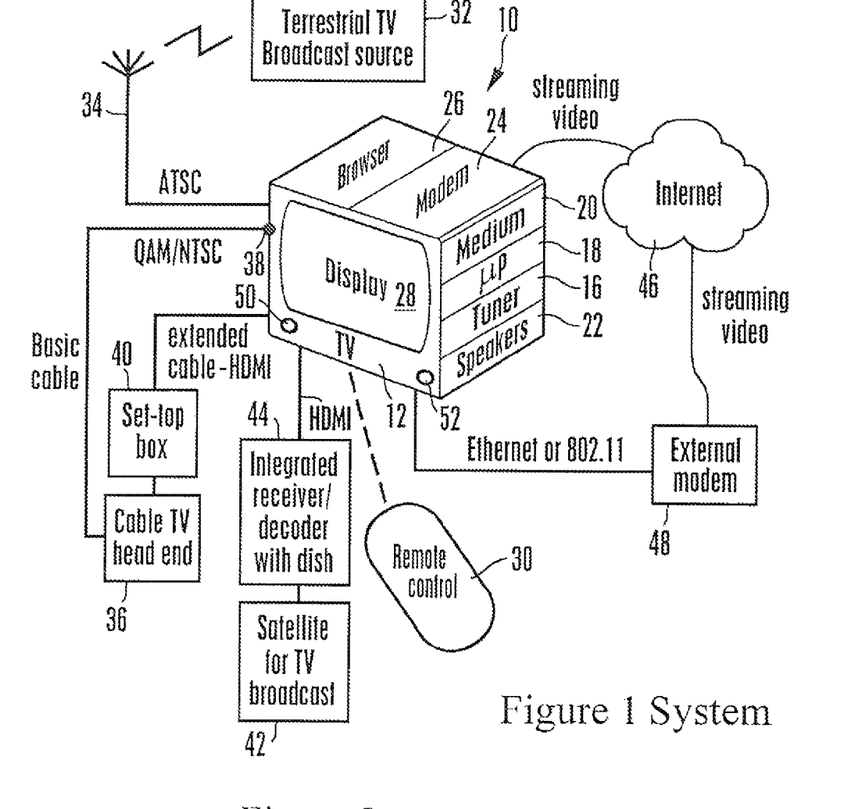
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 16 to provide to the processor 16 video images of viewers looking at the display 28. In some non-limiting embodiments, the processor 16 executes facial recognition using the video images received from the camera 50 to identify particular viewers. The processor 16 also stores images of viewers on the medium 20 in non-limiting embodiments for future determination of whether a viewer is recognized when compared to stored images, or whether a recently received image relates to a new, or non-recognized, viewer. If desired, the processor 16 also creates and/or associates a profile with a user and/or stored images of the user and store the profile on the medium 20. A microphone 52 may also be provided on the chassis or separate therefrom and can be electrically connected to the processor 16 to provide viewer-generated voice commands to the processor 16.

Figure 2:
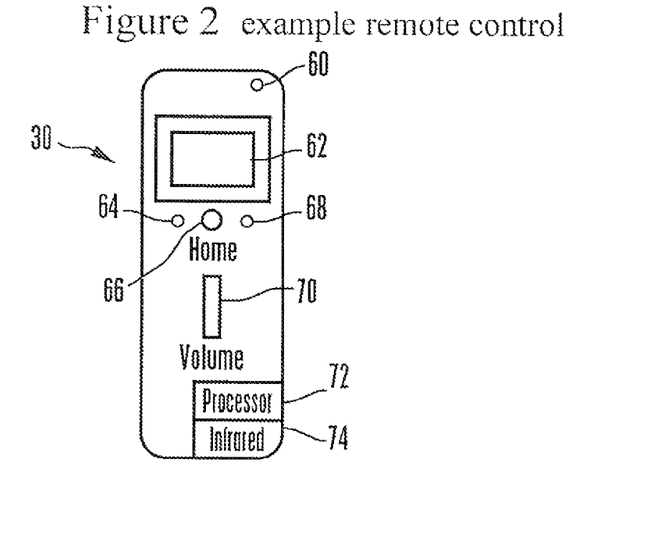
FIG. 2 is a plan view of an example remote control (RC) that may be used to control the graphical user interfaces (GUI) described herein, schematically showing the processor and wireless transceiver.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

Figure 3:
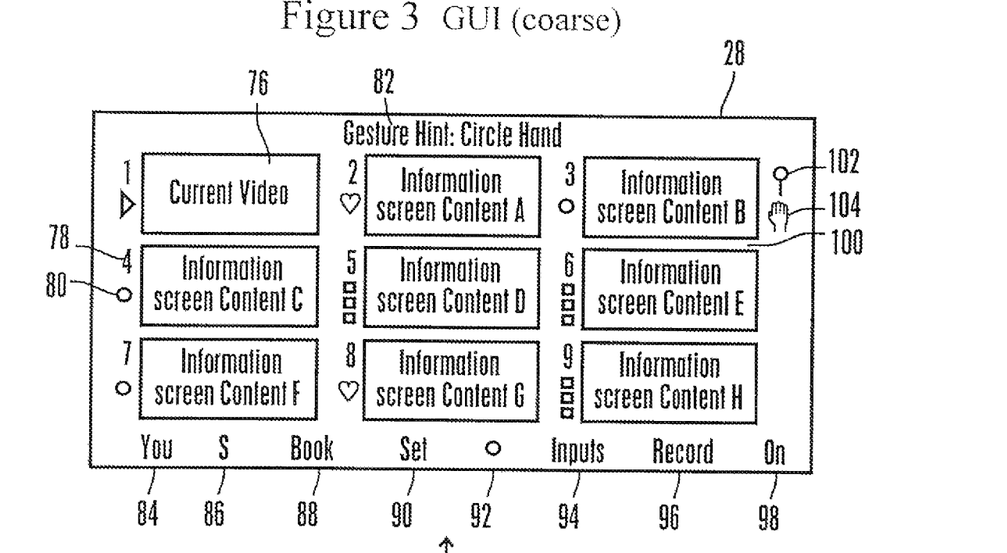
FIG. 3 is a screen shot of a nine panel GUI in a coarse mode suitable for gesture control.
Figure 4:
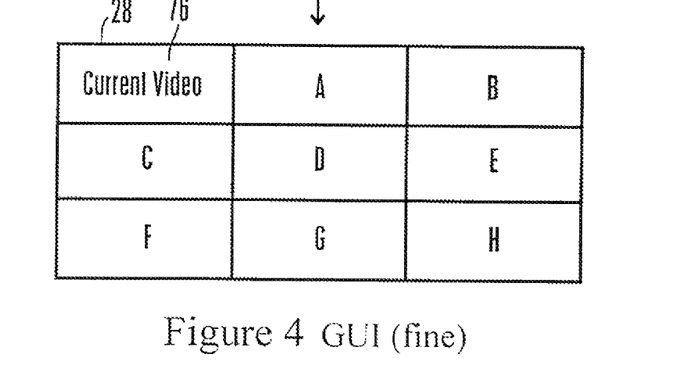
FIG. 4 is a screen shot of a nine panel GUI in a fine mode suitable for RC control.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

Figure 5:
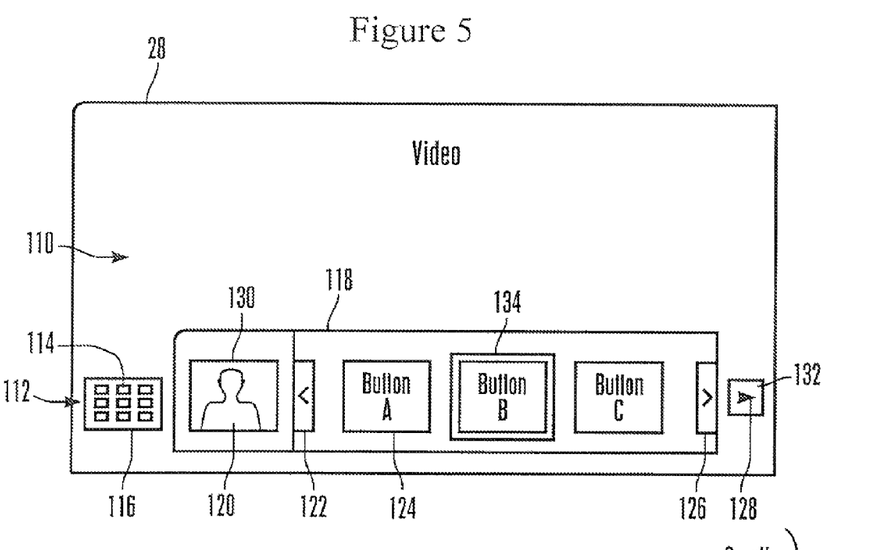
FIGS. 5 and 6 are shots of an example GUI in the touch pad input mode, illustrating that the focus moves on the display over stationary buttons as the viewer inputs a move signal on the touch pad.
Figure 6:
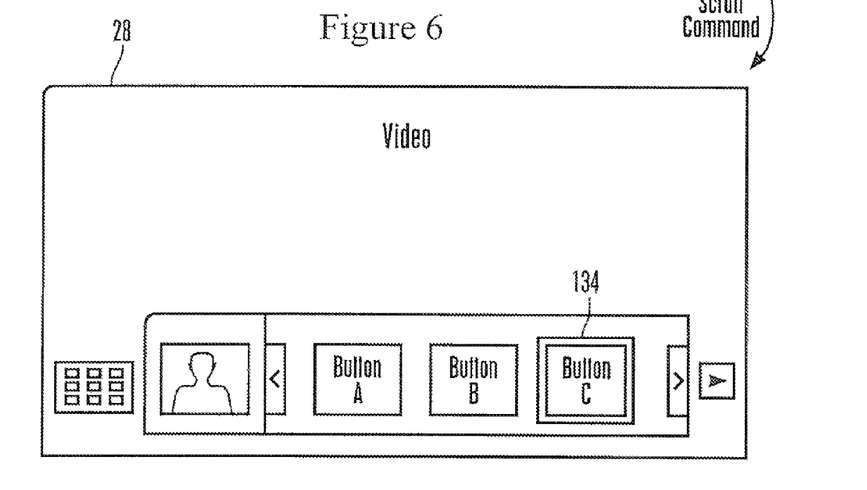
Figure 7:
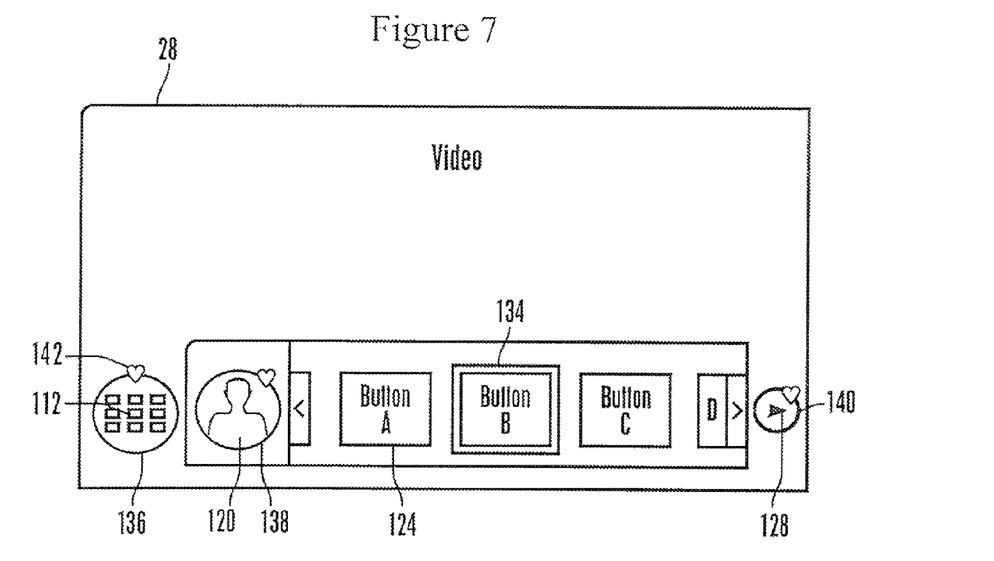
FIGS. 7 and 8 are shots of the example GUI but in the free space gesture input mode, illustrating that the buttons move on the display under a stationary focus as the viewer inputs a move signal using a free space gesture.
Figure 8:
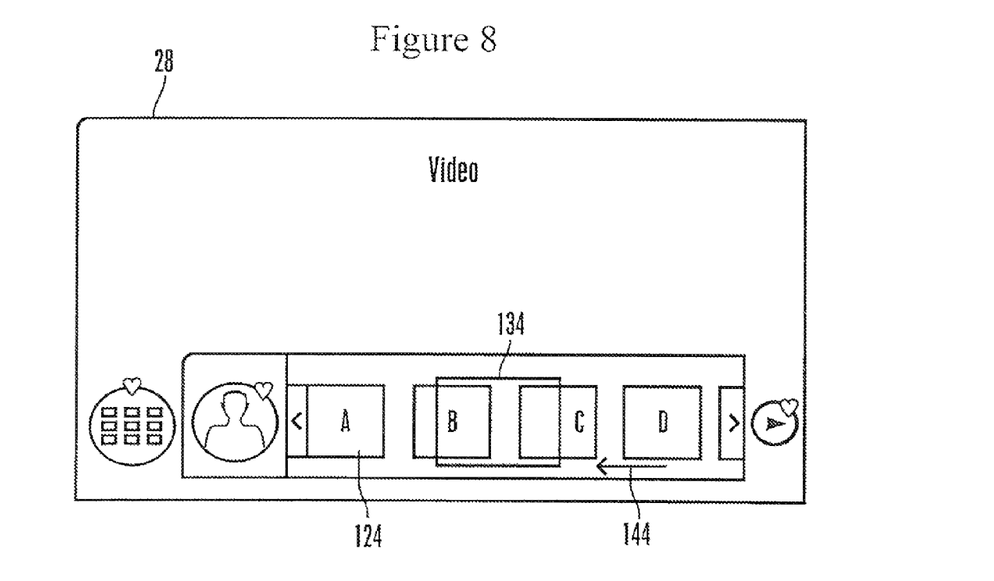

FIGS. 5 and 6 illustrate an example GUI 110 that can be superimposed on the video presentation shown on the display 28 when the viewer has elected to input commands using the touch pad 62 of the RC 30. FIGS. 7 and 8, in contrast, show the GUI 110 whose appearance and behavior have been modified slightly for better employment when the viewer has elected to input commands using gestures in free space, while nonetheless maintaining substantially the same look and feel as when input is via the RC 30. The principles explained herein apply to other GUIs, however, it being understood that the explanation of the specific GUI 110 is intended to be exemplary of general principles.

With more particularity and referring first to FIGS. 5 and 6, the example GUI 110, from left to right in the illustration shown, a content panel GUI icon 112 appears, mimicking, by means of miniature empty boxes 114, the grid of information panels shown in FIGS. 3 and 4. Selection of the GUI icon 112 invokes the GUI shown in FIG. 3 or FIG. 4. Note that a border 116 of a particular shape (in the example shown, rectangular) surrounds the GUI icon 112 for purposes to be shortly disclosed.

The example GUI 110 also includes an elongated button box 118 which contains, from left to right, a button genre indicator 120, indicating the genus of the ensuing buttons (in the example shown, buttons selectable to cause respective viewer profiles to be invoked by the AVDD), a scroll left arrow 122, and plural selectable buttons 124, labeled for convenience in FIGS. 5 and 6 buttons "A", "B", and "C". Following the buttons 124 is a scroll right arrow 126 and to the right of the button box 118, a GUI scroll button 128, which when selected causes a next GUI to be presented on the display 28. Note that the button genre indicator 120 and GUI scroll button 128 have respective borders 130, 132 that are the same shape as the border 116 of the GUI icon 112.

As indicated by the outer perimeter line 134 surrounding the button "B", the current focus of the GUI 110 is on the button "B". This means that responsive to a "select" command input by means of the RC 30, the function of the button "B" is invoked. In this example, selecting button "B" causes settings corresponding to a viewer "B" profile to be invoked. Note that the focus may be indicated by any appropriate visible means such as highlighting the button in focus, presenting a highlighted border of the button, or other means.

Should the viewer instead wish to move the focus 134 to another button, e.g., to button "C" so as to invoke settings corresponding to a viewer "C" profile, the viewer may move a finger against the touch pad 62 of the RC 30 in a rightward direction, causing the focus 134 to move right on the display 28 as shown in FIG. 6, over the button "C". Note that in the touch pad entry mode the buttons 124 do not move translationally, but only the focus 134 moves translationally, except when the focus moves over the scroll button 126 to cause additional buttons to move into view onscreen.

The contrast between the GUI 110 appearance and behavior in the touch pad input mode illustrated in FIGS. 5 and 6 and the GUI 110 appearance and behavior in the free space gesture input mode illustrated in FIGS. 7 and 8 may now be appreciated. First, the borders 116, 130, and 132 around the content panel GUI icon 112, button genre indicator 120, and GUI scroll button 128 in FIGS. 5 and 6 have been replaced by respective borders 136, 138, and 140 in FIGS. 7 and 8, all of which have the same shape as each other (in this example, circles with small motion-indicating circles 142 on the circumference) and different shapes than the shapes of the borders shown in FIGS. 5 and 6. In this way, the appearance of the GUI is internally consistent with the input mode and is easily distinguishable to a viewer from its appearance in the other input mode, to clearly and intuitively signal to the viewer which input mode is active without losing the overall look and feel of the GUI.

Furthermore, by using differently shaped borders depending on the input mode, the viewer is given hints as to the mode and the means to invoke the mode. In the present example, the rectangular borders in FIGS. 5 and 6 resemble the rectangular shape of the RC 30, while the circular borders with small motion-indicating circles 142 in FIGS. 7 and 8 can represent a motion, in this case, a circular motion of the hand in free space, to invoke the gesture mode and/or toggle between the touch pad input mode and gesture input mode. Additionally, merely using the touch pad 62 to generate a signal can immediately switch from a gesture input mode to a touch pad input mode.

Second, the behavior of the GUI changes to more appropriately afford convenient operation based on the particular input mode invoked. In this specific example, in contrast to the GUI 110 behavior in the touch pad input mode, when a scroll command is received in the gesture input mode, as illustrated in cross-reference to FIGS. 7 and 8 the focus 134 remains stationary while the underlying buttons 124 move translationally across the display 28 as indicated by the arrow 144. Thus, with the focus initially on the button "B" in FIG. 7, responsive to a "scroll left" command as may be initiated by a viewer waving his hand to the left, captured by the camera 50, and input to the processor 18 to interpret as a scroll left command, the focus 134 remains stationary on the display 28 while the buttons 124 scroll beneath the focus 134 (FIG. 8) until the viewer stops the control command with the desired button 124 under the focus 134. Thus, in the gesture input mode the buttons 124 always move responsive to a scroll command, whereas recall that in the touch pad input mode the focus moves and not the buttons except in cases where the focus is on an end button and the viewer continues to scroll to cause additional, new buttons to move into view at that point.

It may now be appreciated that since the touch pad 62 typically affords finer control than gestures in free space, having the focus move, and not the buttons, gives the viewer finer control and a better visual impression of the results of his scroll command. On the other hand, having the focus remain stationary while moving the buttons past it can be more appropriate to a viewer gesturing in free space distanced from the AVDD. In both cases, however, the GUI remains the same from input mode to input mode in that the functions underlying the various selector elements remain unchanged regardless of input mode; only its appearance and behavior change based on input mode.

Figure 9:
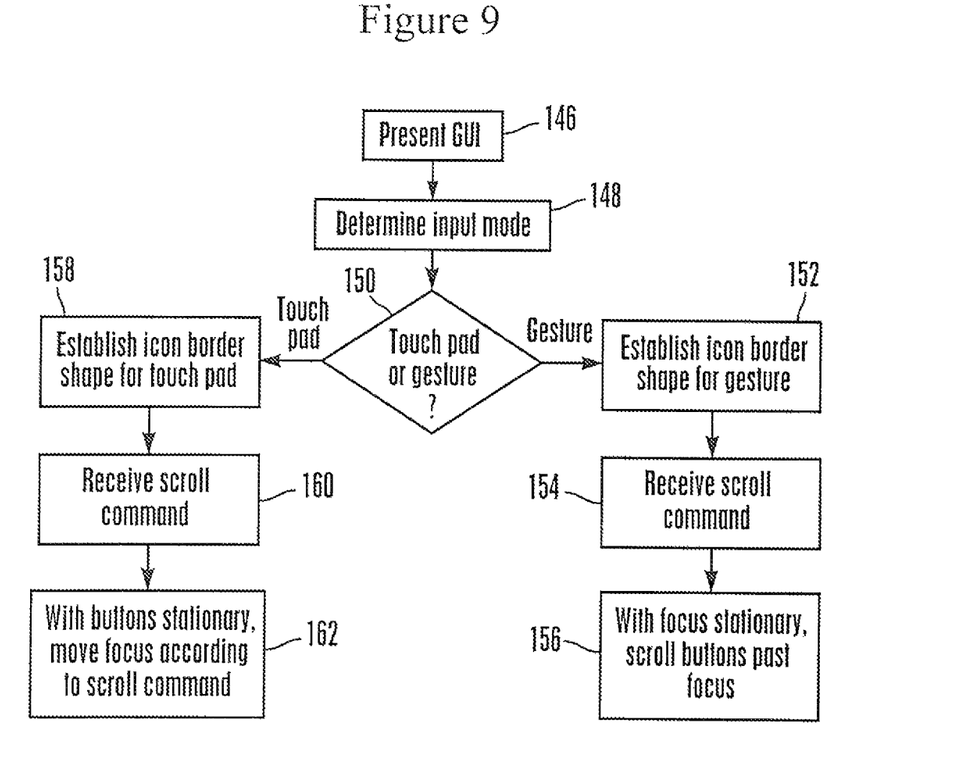
FIG. 9 is a flow chart showing example logic related to FIGS. 5-8.

FIG. 9 illustrates logic connected to the GUI 110. Commencing at block 146, the processor 18 presents the GUI 110 on the display 28. Proceeding to block 148, the processor 18 determines which input mode is active. This determination may be made in any number of ways. For example, a signal from the RC 30 can be interpreted by the processor 18 that touch pad input mode should be active, while a predetermined gesture in free space as captured by the camera 50 may be interpreted to mean that gesture input mode is active. The viewer may switch back and forth between input modes as desired.

Decision diamond 150 indicates that when gesture input mode is active, the logic branches to block 152 to establish the circular borders of FIGS. 7 and 8. A scroll command is received at block 154 when the camera captures a scroll gesture by the viewer, and at block 156 the focus is held stationary on the display responsive to the scroll command while the buttons scroll past the focus.

In contrast, when touch pad input mode is active the logic branches from decision diamond 150 to block 158 to establish the rectangular borders of FIGS. 5 and 6. A scroll command is received at block 160 from the RC 30 responsive to a viewer moving a finger across the touch pad 62 (or, equivalently, pressing scroll arrows on the RC 30). At block 162 the focus is moved over the stationary buttons.

While the particular GUI FOR AUDIO VIDEO DISPLAY DEVICE (AVDD) WITH PERVASIVE APPEARANCE BUT CHANGED BEHAVIOR DEPENDING ON COMMAND INPUT MODE is herein shown and described in detail, it is to be understood that the subject matter which is encompassed by the present invention is limited only by the claims.

What is claimed is:

1. Audio video display device (AVDD) comprising:
processor;
video display; and
computer readable storage medium bearing instructions executable by the processor to:
present a graphical user interface (GUI) on the display, the GUI including plural selector elements;
present an indication of a focus on the GUI;
responsive to a determination that a first input mode is active and a scroll command is received, moving the focus on the display from a first selector element to a second selector element without moving either selector element; and
responsive to a determination that a second input mode is active and a scroll command is received with the focus on a first selector element, not moving the focus on the display and moving a second selector element to be juxtaposed with the focus, wherein the GUI includes at least one border around at least one GUI element and responsive to a determination that the first input mode is active, presents the border in a first shape, and responsive to a determination that the second input mode is active, presents the border in a second shape different from the first shape.

2. The AVDD of Clam 1, wherein the first input mode is an input device input mode in which a person enters commands using an input device communicating with the AVDD.

3. The AVDD of claim 2, wherein the second input mode is a gesture input mode in which a person enters commands by making body gestures in free space distanced from the AVDD, a camera capturing images of the body gestures and providing the images to the processor.

4. The AVDD of claim 1, wherein the GUI includes a content panel GUI icon mimicking a grid of information panels and selectable to invoke a GUI presenting the grid of information panels, the border being around the content panel GUI icon.

5. The AVDD of claim 1, wherein the GUI includes a button genre indicator indicating a genus of selector elements presented by the GUI, the border being around the button genre indicator.

6. The AVDD of claim 1, wherein the focus indicates which button a selection of which will cause an associated function to be invoked.

7. Method comprising:
presenting a graphical user interface (GUI) on a video display;
determining which one of at least first and second command input modes is active;
responsive to a determination that the first input mode is active, causing the GUI to have a first appearance and a first behavior; and
responsive to a determination that the second input mode is active, causing the GUI to have a second appearance and a second behavior different from the first appearance and first behavior, wherein the GUI includes at least one border around at least one GUI element in the GUI, and responsive to a determination that the first input mode is active, the method includes presenting the border in a first shape, and responsive to a determination that the second input mode is active, the method includes presenting the border in a second shape different from the first shape.

8. The method of claim 7, wherein the first input mode is an input device input mode.

9. The method of claim 7, wherein the first appearance includes at least one rectangular border around a GUI element.

10. The method of claim 7, wherein the first behavior is moving a display focus on the GUI over stationary selector elements.

11. The method of claim 7, wherein the second input mode is a free space gesture input mode.

12. The method of claim 11, wherein the second appearance includes at least one circular border around a GUI element.

13. The method of claim 11, wherein the second behavior is moving selector elements past a stationary display focus on the GUI.

14. Audio video display device (AVDD) comprising:
processor;
video display; and
computer readable storage medium bearing instructions executable by the processor to:
present on the display a graphical user interface (GUI) operable in at least first and second input modes;
when the first input mode is active, giving the GUI a first behavior and/or appearance; and
when the second input mode is active, giving the GUI a second behavior and/or appearance, wherein the GUI includes plural selector elements and the processor presents an indication of a focus on the GUI, the processor:
responsive to a determination that the first input mode is active and a scroll command is received, moving the focus on the display from a first selector element to a second selector element without moving either selector element; and
responsive to a determination that the second input mode is active and a scroll command is received with the focus on a first selector element, not moving the focus on the display and moving a second selector element to be juxtaposed with the focus, wherein the GUI includes at least one border around at least one GUI element and responsive to a determination that the first input mode is active, presents the border in a first shape, and responsive to a determination that the second input mode is active, presents the border in a second shape different from the first shape.

15. The AVDD of claim 14, wherein the GUI is given the first behavior when the first input mode is active and the second behavior when the second input mode is active.

16. The AVDD of claim 14, wherein the GUI is given the first appearance when the first input mode is active and the second appearance when the second input mode is active.

17. The AVDD of claim 14, wherein the first input mode is an input device input mode in which a person enters commands using an input device communicating with the AVDD and the second input mode is a gesture input mode in which a person enters commands by making body gestures in free space distanced from the AVDD, a camera capturing images of the body gestures and providing the images to the processor.

* * * * *